United States Patent
Dornstetter et al.

(10) Patent No.: US 6,868,126 B1
(45) Date of Patent: Mar. 15, 2005

(54) MODULATING A DIGITAL SIGNAL WITH NARROW SPECTRUM AND SUBSTANTIALLY CONSTANT ENVELOPE

(75) Inventors: Jean-Louis Dornstetter, Suzanne Lenglen (FR); Eric Georgeaux, Montiguy le Bretonneux (FR)

(73) Assignee: Nortel Matral Cellular, Guyancourt Cedex (FR)

(*) Notice: Subject to any disclaimer, the term of this patent is extended or adjusted under 35 U.S.C. 154(b) by 0 days.

(21) Appl. No.: 09/582,127
(22) PCT Filed: Dec. 21, 1998
(86) PCT No.: PCT/FR98/02812
§ 371 (c)(1),
(2), (4) Date: Aug. 21, 2000
(87) PCT Pub. No.: WO99/33238
PCT Pub. Date: Jul. 1, 1999

(30) Foreign Application Priority Data
Dec. 22, 1997 (FR) ............................................. 97 16454

(51) Int. Cl.⁷ .......................... H04L 27/04; H04L 27/12; H04L 27/20
(52) U.S. Cl. ........................................ 375/295; 375/316
(58) Field of Search ................................ 375/295, 314, 375/305, 303, 334, 336, 259, 261, 268, 298, 300, 320, 324, 325, 340; 332/103, 149; 329/304, 347

(56) References Cited

PUBLICATIONS

Canturk, I. et al, "An Experimental Investigation of GMSK Modulation", Apr. 1994, IEE Proceedings of the Mediterranean Electrotechnical Conference, vol. 1, pp. 141–144.*

* cited by examiner

Primary Examiner—Jean B. Corrielus
(74) Attorney, Agent, or Firm—Barnes & Thornburg LLP

(57) ABSTRACT

A transmission signal (S) resulting from modulation of a digital data signal by a modulation function dependent on time t, the data signal being formed of a series of bits ($b_k$) each identified by its rank k and having a duration T, the transmission signal (S) consisting of a summation indexed to the rank k of the product of the complex constant j to the power k, of the modulation function (h(t−kT) and of an input signal. The input signal F(k) being a function of the data signal ($b_k$), the modulation function h(t−kT) is a Gaussian function of time t.

12 Claims, 2 Drawing Sheets

MODULATING A DIGITAL SIGNAL WITH NARROW SPECTRUM AND SUBSTANTIALLY CONSTANT ENVELOPE

RELATED APPLICATION

This application is the national filing of international application number PCT/FR98/02812, which claims the priority of FR 97/16454 filed Dec. 22, 1997.

BACKGROUND OF THE INVENTION

The present invention relates to a technique for modulating a digital signal.

It therefore applies to the transmission art, in particular the radio transmission art.

A typical application is aimed at radio systems, in particular "broadband" systems. These systems are naturally designed to offer a high capacity and it is therefore necessary to use a modulation technique that offers high spectral efficiency, which amounts to saying that the spectrum of a given channel must be as narrow as possible consistent with its technical specifications.

Moreover, constant envelope modulation is generally employed, which minimizes the complexity of transmitters. If the signal features variations of relatively large amplitude, the amplification stages must be perfectly linear, especially the power amplifier.

It nevertheless appears to be the case that all forms of constant envelope modulation known in the art until now have a spectrum which features a side lobe.

If it is within the spectrum of a neighboring channel, the side lobe increases the level of interference in that neighboring channel.

The Gaussian minimum shift keying (GMSK) modulation technique employed in the GSM has a −40 dBc side lobe at 200 kHz from the main lobe. The spacing between two adjacent channels is also 200 kHz. Obviously this reduces spectral efficiency.

The spectrum of quadrature amplitude modulation (QAM) has no side lobe if an appropriate filter is used.

However, these modulation techniques cause strong variations in the amplitude of the modulated signal. As mentioned above, it is necessary to use more complex and therefore more cost amplifiers in this case.

SUMMARY OF THE INVENTION

The object of the present invention is therefore to provide a modulation technique which offers a spectrum with no side lobe but which still has a practically constant envelope.

The invention therefore provides a transmission signal resulting from modulation of a digital data signal by a modulation function dependent on time t, the data signal being formed of a series of bits $b_k$ each identified by its rank k and having a duration T, the transmission signal (S) consisting of a summation indexed to the rank k of the product of the complex constant i to the power k, of the modulation function h(t−kT) and of an input signal. According to the invention, since the input signal is a function of the data signal, the modulation function is a Gaussian function of time t.

The modulation function is advantageously defined by the following equation, in which the parameter σ is a form factor which determines the spreading of a bit:

$$h(t) = \frac{1}{\sigma T \sqrt{2\pi}} e^{-\frac{t^2}{2\sigma^2 T^2}}$$

The simplest embodiment of the invention defines the input signal as equal to the data signal.

However, if this solution is adopted, the transmission signal is still subject to amplitude variations which, although minimal, still impose some constraints on the amplifiers of the transmitter.

Accordingly, the input signal E(k) preferably has the value:

$$F(k) = \sum_{n=0}^{N} a^n B_k^n$$

where:

N is a positive natural integer, a is a positive correction constant, the polynomial $B_k^n$ is defined as follows:

where:

$$B_k^n = \sum_{l=i}^{L} \left( \prod_{i=0}^{2M} b_{k+p_{l,i}} \right)$$

a family ($F_1$) of relative integers $P_{l,i}$ is constructed so that there is a natural integer M
which satisfies the following equations:

$$\sum_{i=0}^{M} p_{1,2i} = \sum_{i=1}^{M} p_{1,2i-1}$$

$$\sum_{i=0}^{M} p_{1,2i}^2 - \sum_{i=1}^{M} p_{1,2i-1}^2 = 2n$$

$p_{l,i} < p_{l,i+1}$ (for all i)

L represents the total number of these families.

For example, the correction constant has the value $$e^{-\frac{1}{\sigma^2}}.$$

The invention also relates to a modulator for producing the transmission signal.

In a preferred embodiment of the invention, the modulator comprises a digital processor which receives said input signal and produces the real part and the imaginary part of the transmission signal, a first mixer which multiplies the real part by a carrier, a phase-shifter which receives the carrier and phase-shifts it by π/2, a second mixer which multiplies the imaginary part by the output signal of the phase-shifter, and an adder which sums the output signals of the two mixers.

When the correction level is greater than zero the digital processor includes a first module for producing the polynomials $B_k^n$.

The digital processor further comprises a second module for producing digital samples of the transmission signal, four samples $E_{rk+1}$ being associated with the bit $b_k$ for i varying from 0 to 3 and having the value:

$$E_{4k+i} = \sum_{q=k}^{k-5} j^q \cdot \left(b_q + \frac{1}{8} \cdot B_q^1 + \frac{1}{64} \cdot B_q^2\right) \cdot h_{4(k-q)+i}$$

The invention also provides a demodulator for reproducing the data signal from the transmission signal.

The demodulator preferably comprises a baseband transposition unit which receives a signal which has been modulated by the modulation function, a complex multiplier which multiplies the output signal of the transposition unit by the expression $$e^{-j\frac{\pi i}{2i}},$$

a convolution operator which convolutes the output signal of the complex multiplier and the modulation function, and a decision unit which reproduces the data signal as a function of the sign of the real part of the result of the convolution.

The transposition unit is routinely a Hilbert filter.

BRIEF DESCRIPTION OF THE DRAWINGS

The present invention will now emerge in more detail from the following description of embodiments of the invention, which description is given by way of illustrative example only and with reference to the accompanying diagrammatic drawings, in which.

DESCRIPTION OF THE PREFERRED EMBODIMENTS

Figure 1:
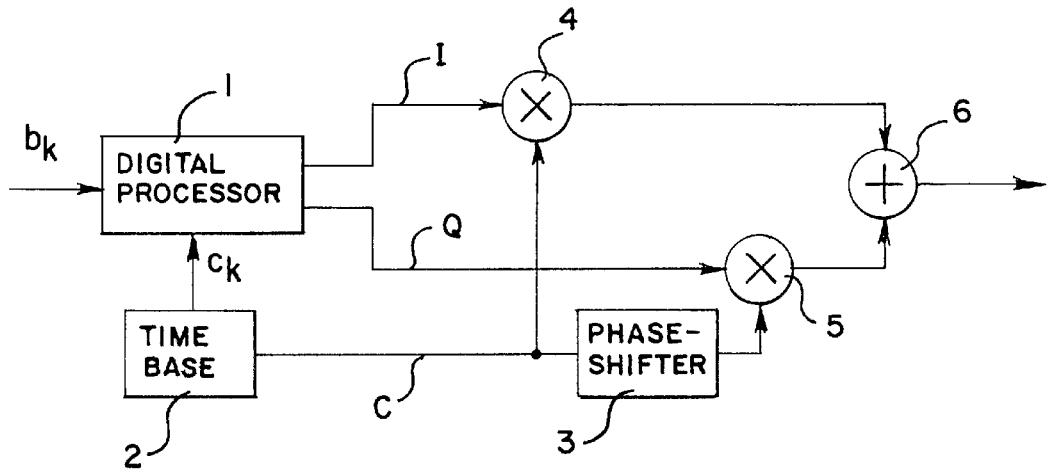
FIG. 1 shows a modulator according to the invention.

It is therefore a question of modulating a digital data signal which consists of a stream of bits $b_k$ taking the value +1 or −1.

The following expression is known in the art for a modulated transmission signal S with various types of modulation:

where:

$$S = \sum_k j^k \cdot h(t-kT) \cdot b_k$$

k is the index of the current bit $b_k$, j is the complex constant such that $j^2 = -1$, T is the duration of a bit, t represents time, and h is the modulation function.

If h is a rectangular function, the modulation is referred to as "offset QPSK".

According to the invention, h is a Gaussian function which takes the following form, for example:

$$h(t) = \frac{1}{\sigma T \sqrt{2\pi}} e^{-\frac{t^2}{2\sigma^2 T^2}}$$

The parameter σ is a form factor which determines the spreading of a bit.

If B denotes the half-bandwidth of the spectrum at the 3 dB points, and using the abbreviation ln for natural logarithms, the following equation applies:

$$B \cdot T = \frac{\sqrt{\ln 2}}{2\pi\sigma}$$

Adopting a Gaussian modulation function eliminates the side lobe present in constant envelope modulation spectra.

Note however that the modulated signal is still subject to amplitude variations, although they are significantly reduced compared to QAM.

Accordingly, and in accordance with another aspect of the invention, a correction term C is added to the modulated signal as defined above: e with:

$$S = \sum_k j^k \cdot h(t-kT) \cdot b_k + C$$

where:

$$C = \sum_k j^k \cdot h(t-kT) \cdot \left[\sum_{n=1}^{N} a^n B_k^n\right]$$

N is an integer representing a correction level, and
a is a constant with the value $$e^{-\frac{1}{\sigma^2}}.$$

The polynomials $B_k$ are constructed in the following manner. For a given value of n, all families of relative integers $P_{l,i}$ are found such that there is a natural integer M satisfying the following equations:

$$\sum_{i=0}^{M} p_{1,2i} = \sum_{i=1}^{M} p_{1,2i-1} \tag{1}$$

$$\sum_{i=0}^{M} p_{1,2i}^2 - \sum_{i=1}^{M} p_{1,2i-1}^2 = 2n \tag{2}$$

$$p_{l,i} < p_{l,i+1} \text{ (for all i)} \tag{3}$$

The limit values of $p_{l,i}$ must be found. They are $p_{1,0}$ and $p_{1,2M}$.

From equation (1) it follows that $p_{1,0}$ is negative or zero:

$$p_{1,0} = \sum_{i=1}^{M} (p_{1,2i-1} - p_{1,2i})$$

From equation (3), the above expression is negative or zero.

Similarly, the term $P_{1,2M}$ is positive or zero.

Equation (1) can be written:

$$p_{1,2M} = \sum_{i=1}^{M} (p_{1,2i-1} - p_{1,2i-2})$$

From equation (3), this expression is positive or zero.

Because the relative integers $p_{l,i}$ constitute a strictly increasing series, there is only one natural integer z for which the product $p_{l,z} \cdot p_{l,z-1}$ is negative or zero.

If z is even, equation (2) can be written:

$$\sum_{i=\frac{z}{2}+1}^{M}(p_{1,2i}^2-p_{1,2i-1}^2)+p_{1,z}^2+\sum_{i=0}^{\frac{z}{2}-1}(p_{1,2i}^2-p_{1,2i+1}^2)=2n$$

If z is odd, equation (2) can be written:

$$\sum_{i=\frac{z+1}{2}}^{M}(p_{1,2i}^2-p_{1,2i-1}^2)+p_{1,z-1}^2+\sum_{i=0}^{\frac{z-3}{2}}(p_{1,2i}^2-p_{1,2i+1}^2)=2n$$

In the above two expressions, the left-hand member of the equation takes the form of a sum of positive terms, which implies that each of those terms is at most equal to 2n.

Accordingly:

if z=2M:

$$p_{1,2M} < \sqrt{2n}$$

if z<2M:

$$p_{1,2M}^2 - p_{1,2M-1}^2 \leq 2n$$

$$(p^{1,2M}-p_{1,2M-1})(p_{1,2M}-p_{1,2M-1}) \leq 2n$$

letting $(p_{1,2M}-p_{1,2M-1})=a$, with $1 \leq a \leq 2n$ $$2p_{1,2M} - a \leq \frac{2n}{a}, \quad p_{1,2M} \leq \frac{n}{a} + \frac{a}{2}$$

It can easily be shown that $(n/a+a/2) \leq (n+1/2)$ when a is between 1 and 2n.

It follows that $p_{1,2M}$ is less than or equal to n. It can be shown in the same way that $p_{1,0}$ is greater than or equal to −n.

It follows from the above that the set of relative integer families $p_{l,i}$ is a finite set.

For a given value of n, now consider the first family $p_{l,i}$, which is obtained for l=1. That family is constructed starting from $p_{1,0}=-n$, after which the series of relative integers $p_{1,1}, \ldots, p_{1,2M}$ which satisfies equations (1), (2) and (3) is found empirically.

For example, if n=1, there is only one family $F_1=\{p_{1,0}, p_{1,1}, p_{1,2}\}=\{-1, 0, +1\}$.

If n is greater than 1, all the families are found in the same manner by successively incrementing all $p_{l,i}$. In this case, l varies from 1 to L.

For the first values of n, those families are:

$-n = 2, F_1 = \{p_{l,0}, p_{l,1}, p_{l,2}\} = \{-2, -1, +1\}$
$\quad F_2 = \{p_{2,0}, p_{2,1}, p_{2,2}\} = \{-1, +1, +2\}$ $-n = 3, F_1 = \{p_{l,0}, p_{l,1}, p_{l,2}\} = \{-3, -2, +1\}$
$\quad F_2 = \{p_{2,0}, p_{2,1}, p_{2,2}, p_{2,3}, p_{2,4}\} = \{-2, -1, 0, +1, +2\}$
$\quad F_3 = \{p_{3,0}, p_{3,1}, p_{3,2}\} = \{-1, +2, +3\}$ $-n = 4, F_1 = \{p_{l,0}, p_{l,1}, p_{l,2}\} = \{-4, -3, +1\}$
$\quad F_2 = \{p_{2,0}, p_{2,1}, p_{2,2}, p_{2,3}, p_{2,4}\} = \{-3, -2, 0, +1, +2\}$
$\quad F_3 = \{p_{3,0}, p_{3,1}, p_{3,2}\} = \{-2, +0, +2\}$
$\quad F_4 = \{p_{4,0}, p_{4,1}, p_{4,2}, p_{4,3}, p_{4,4}\} = \{-2, -1, 0, +2, +3\}$
$\quad F_5 = \{p_{5,0}, p_{5,1}, p_{5,2}\} = \{-1, +3, +4\}$ Finally, the polynomial $B_k^n$ is obtained from the following expression:

$$B_k^n = \sum_{1=i}^{L}\left(\prod_{i=0}^{2M} b_{k+p_{1,i}}\right)$$

Returning to the previous examples:

$B_k^1 = b_{k-1} \cdot b_k \cdot b_{k+1}$ $B_k^2 = b_{k-2} \cdot b_{k-1} \cdot b_{k+1} + b_{k-1} \cdot b_{k+1} \cdot b_{k+2}$ 3

$B_k^3 = b_{k-3} \cdot b_{k-2} \cdot b_{k+1} + b_{k-2} \cdot b_{k-1} \cdot b_k \cdot b_{k+1} \cdot b_{k+2} + b_{k-1} \cdot b_{k+2} \cdot b_{k+3}$ $B_k^4 = b_{k-4} \cdot b_{k-3} \cdot b_{k+1} + b_{k-3} \cdot b_{k-2} \cdot b_k \cdot b_{k+1} \cdot b_{k+2} + b_{k-2} \cdot b_k \cdot b_{k+2} + b_{k-2} \cdot b_{k-1} \cdot b_k \cdot b_{k+2} \cdot b_{k+3} + b_{k-1} \cdot b_{k+3} \cdot b_{k+4}$ Returning to the equation of the modulated signal S:

$$S = \sum_k j^k \cdot h(t-kT) \cdot b_k + \sum_k j^k \cdot h(t-kT) \cdot \left[\sum_{n=1}^{N} a^n B_k^n\right]$$

Letting $B_k^0 = b_k$, the signal S can be written:

$$S = \sum_k j^k \cdot h(t-kT) \cdot \left[\sum_{n=0}^{N} a^n B_k^n\right]$$

It is therefore possible to define an input signal $$F(k) = \sum_{n=0}^{N} a^n B_k^n$$

If N=0, this is the simplest embodiment of the invention. The greater the value of N, the more limited are the amplitude variations of the modulated signal S.

Note that the spectrum of this signal is independent of N. Its value is:

$$[H_\alpha(f)]^2 = e^{-(2\pi\alpha fT)^2}$$

The invention naturally relates to a modulator for producing the signal S modulated onto a carrier. Although the implementation of a modulator so specified will be obvious to the skilled person, one of many examples will now be described.

Referring to FIG. 1, the modulator compromises a digital processor 1 which receives the bits $b_k$ to produce the real part I and the imaginary part Q of the modulated signal S:

$S=I+jQ$.

It also comprises a first mixer 4 for multiplying the real part I by the carrier C and a second mixer 5 for multiplying the imaginary part Q by the carrier phase-shifted by $\pi/2$. To this end, a phase-shifter 3 receives the carrier and feeds it to the second mixer 5.

It also comprises an adder 6 for summing the output signals of the two mixers 4,5.

Finally, the modulator includes a time base 2 which supplies the clock signal Ck to the digital processor 1 and the carrier to the first mixer 4 and to the phase-shifter 3.

It works for the most varied values of the various constants and in particular with a correction level N equal to 0. However, to obtain good performance, and to facilitate the task of the processor 1, the following values are given by way of example:

form factor:

$$\sigma = \frac{1}{\sqrt{3\ln 2}};$$

because of this, the constant $$a = e^{-\frac{1}{\sigma^2}}$$

has the value ⅛, which enables multiplication by a means of a shift of three bits to the right, correction level N=2, value of bits $b_k$: +1 or −1, modulated signal S expressed on 12 bits, oversampling factor: 4.

The modulated signal S is therefore a series of digital samples produced at the rate of four per bit period T.

The modulation function h(t) is also represented by a series of positive numbers $h_q$ on 11 bits. An appropriate scale factor is chosen so that the modulated signal S can be coded on 12 bits:

$(h_q)_{0 \le q \le 11}$={0,1,5,17,47,116,253,485,816,1205,1563, 1780}

The function h(t) is even so that for any c from 0 to 11 $h_{23-q}=h_q$. Given the scale factor adopted, $h_q$ is zero for q<0 or q>23: the function is memorized for −3T<t<3T.

Because of the oversampling, it is possible to set q=4.k+i, for i varying from 0 to 3; in other words, k is the integer part of q/4.

Figure 2:
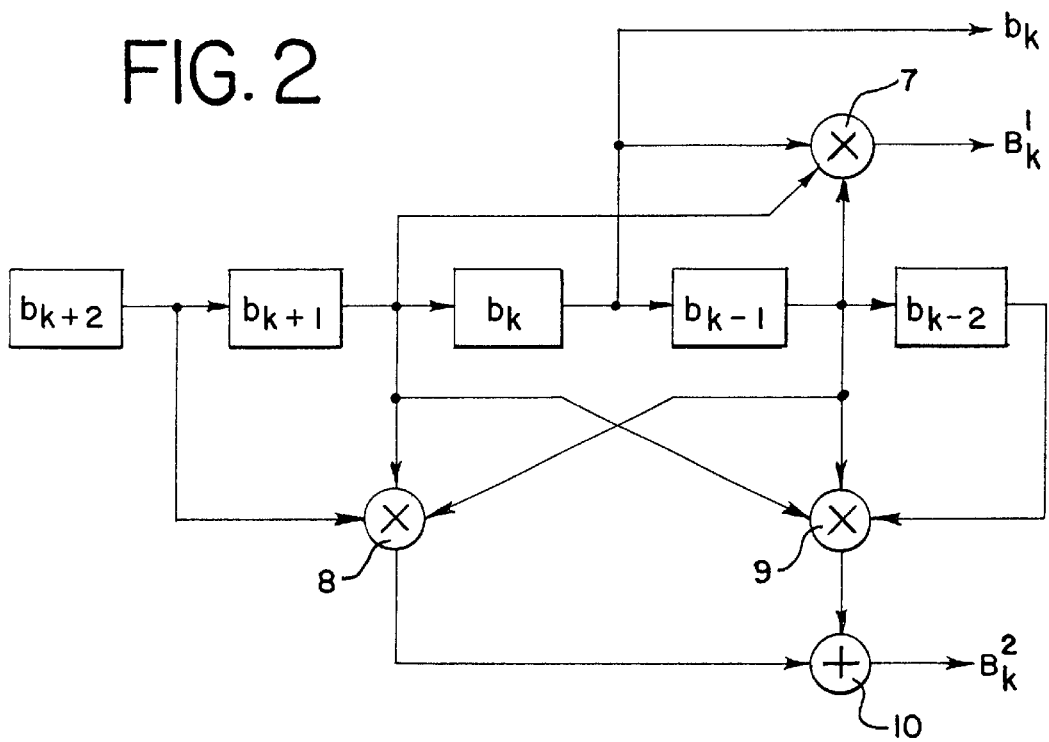
FIG. 2 shows a first module of one embodiment of the modulator.

Referring to FIG. 2, and by the way of example, the processor 1 comprises a first module for calculating the expressions $B_k^1$ and $B_k^2$. Here the corresponding calculations are performed by means of shift register which contains the bits $b_{k+2}$ to $b_{k-2}$ at a reference time. $B_k^1$ is obtained by a first multiplier 7 which forms the product of the bits $b_{k-1}$, $b_k$ and $b_{k+1}$. To obtain $B_k^2$, a second multiplier 8 forms the product of the bits $b_{k-2}$, $b_{k-1}$ and $b_{k+1}$, a third multiplier 9 forms the product of the bits $b_{k-1}$, $b_{k+1}$, and $b_{k+2}$, and an adder 10 sums the outputs of the second and third multipliers 8 and 9.

Figure 3:
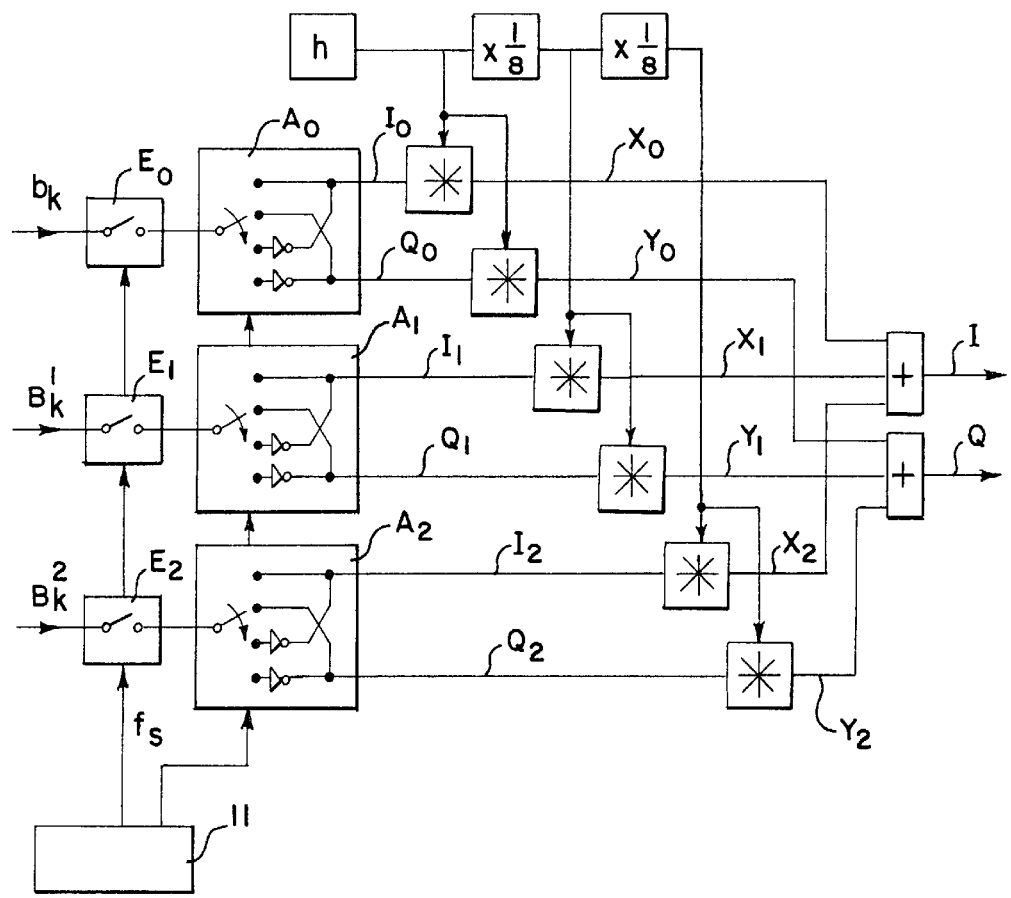
FIG. 3 shows a second module of the same embodiment of the modulator.

The processor 1 also includes a second module, shown in FIG. 3, which calculates the digital samples of the modulated signal S by filtering the oversampled input signals using a filter with impulse response h(t). The four samples $E_{4k+i}$ associated with the bit $b_k$ for i varying from 0 to 3 therefore have the values:

$$E_{4k+i} = \sum_{q=k}^{k-5} j^q \cdot \left( b_q + \frac{1}{8} \cdot B_q^1 + \frac{1}{64} \cdot B_q^2 \right) \cdot h_{4(k-q)+i}$$

The above expression can be written:

$E_{4k+i} = E_{ki}^0 + E_{ki}^1 + E_{ki}^2$ where:

$$E_{ki}^0 = \sum_{q=k}^{k-5} j^q \cdot b_q \cdot h_{4(k-q)+i} = x_0 + jy_0 \quad (4)$$

$$E_{ki}^1 = \sum_{q=k}^{k-5} j^q \cdot \frac{1}{8} \cdot B_q^1 \cdot h_{4(k-q)+i} = x_1 + jy_1 \quad (5)$$

$$E_{ki}^2 = \sum_{q=k}^{k-5} j^q \cdot \frac{1}{64} \cdot B_q^2 \cdot h_{4(k-q)+i} = x_2 + jy_2 \quad (6)$$

The numbers $x_0$, $y_0$, $y_1$, $x_2$ and $y_2$ are real numbers.

For example, the second module includes a first sampling circuit $E_o$ which receives the bit $b_k$ and supplies it to a first router $A_0$ synchronized with the sampling circuit in response to a sampling frequency Fs generated by circuit 11. The first router produces as its output signal $I_0$, successively, the first sample of the bit $b_k$ and then the third sample of the same bit $b_k$ with the sign changed. It also produces as its output signal $Q_0$, successively, the second sample of the bit $b_k$ and then the fourth sample of the same bit $b_k$ with the sign changed. The second module then correlates the output signal $I_0$ with the modulation function h according to equation (4) to produce the first real component $x_0$ (this is symbolized by the operator * in the figure). Note that only the terms corresponding to an even index q are non-zero.

The discrete correlation operation need not be described in more detail because this technique is well-known to the skilled person.

The second module also correlates the output signal $Q_0$ with the modulation function h according to equation (4) to produce the first imaginary component $y_0$. Note that only the terms corresponding to an odd index q are non-zero.

Similarly, the second module comprises a second sampling circuit $E_1$ which receives the signal $B_k^1$ and feeds it to a second router $A_1$ synchronized with that sampling circuit. The second router produces as its output signal $I_1$, successively, the first sample of the term $B_k^1$ and then the third sample of that same term with the sign changed. It also produces as its output signal $Q_1$, successively, the second sample of the term $B_k^1$ and then the fourth sample of that same term with the sign changed. The second module then correlates the output signal $I_1$ with the modulation function h multiplied by the constant a (⅛ in this instance) according to equation (5) to produce the second real component $x_1$.

The second module also correlates the output $Q_1$ with the modulation function h multiplied by ⅛ according to equation (5) to produce the second imaginary component $y_1$.

The second module produces the third real component $x_2$ and the third imaginary component $y_2$ from the expression $B_k^2$ according to equation (6) in an analogous manner.

The real part I of the modulated signal is the result of summing the three real components $x_0$, $x_1$, $x_2$ and its imaginary part Q is the result of summing the three imaginary components $y_0$, $y_1$ and $y_2$.

The invention naturally also relates to a demodulator for recovering the data signal from the modulated signal S. Although the implementation of a demodulator as specified will be evident to the skilled person, one of many examples of its implementation will now be described.

Figure 4:
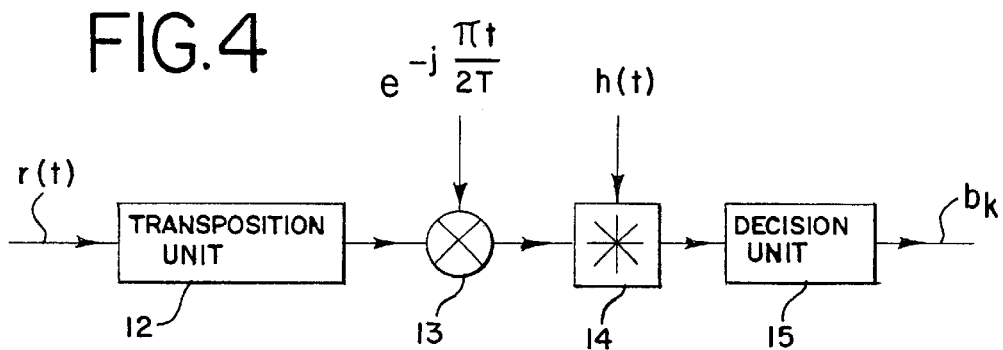
FIG. 4 shows a demodulator according to the invention.

Referring to FIG. 4, the demodulator includes a baseband transposition unit 12 which receives a signal r(t) modulated as described above. The transposition unit is routinely implemented by means of a Hilbert filter.

The demodulator also includes a complex multiplier 13 for multiplying the output signal of the transposition unit 12 by the expression $$e^{-j\frac{\pi \tau}{2T}}$$

to produce a signal whose frequency is equal to one-quarter of the bit time.

It also includes a convolution operator 14 which convolutes the output signal of the complex multiplier 13 and the modulation function h(t) defined above.

The result of this convolution is interpreted by a decision unit 15 which reproduces the bit $b_k$ according to the sign of the real part of the result.

The invention therefore relates to a digital modulation technique which applies regardless of how the modulation function is represented, including by means of a compression law. It is not limited to the embodiments described above. In particular, it is possible to replace any means by equivalent means.

What is claimed is:

1. A method of modulating a digital data signal formed of a series of bits each identified by a respective rank k and each having a duration T, the method comprising the steps of:

providing an input signal F(k) as a function of said data signal;

for each of a plurality of said ranks k, computing a respective product of $j^k$, of a modulation function h(t−kT) being a Gaussian function of time t and of said input signal F(k), where j is a complex constant such that $j^{-2}=-1$;

defining said modulation function as:

$$h(t)=1/(\sigma T\sqrt{2\Pi})*e^{-(t^2/(2\sigma^2 T^2))}$$

where σ is a form factor determining a bit spreading; and summing said computed products to provide a transmission signal.

2. A method as claimed in claim 1, wherein the step of providing the input signal F(k) comprises taking said input signal F(k) as equal to said data signal.

3. A method as claimed in claim 1, wherein the step of providing the input signal F(k) comprises taking said input signal F(k) as equal to:

$$F(k) = \sum_{n=0}^{N} a^n B_k^n$$

where:

N is a positive natural integer, a is a positive correction constant, $B_k^n$ is a polynomial defined as follows:

$$B_k^n = \sum_{l=1}^{L} \left( \prod_{i=0}^{2M} b_{k+p_{l,i}} \right)$$

where:

L is a natural integer; $b_k$ is a bit of rank k

M is a natural integer and, for each integer l such that $1 \leq l \leq L$, the $p_{l,j}$'s are relative integers such that:

$$\sum_{i=0}^{M} p_{1,2i} = \sum_{i=1}^{M} p_{1,2i-1}$$

$$\sum_{i=0}^{M} p_{1,2i}^2 - \sum_{i=1}^{M} p_{1,2i-1}^2 = 2n$$

and $p_{l,i} < p_{l,i+1}$ regardless of i.

4. A method as claimed in claim 3, wherein said correction constant a has the value $$e^{-\frac{1}{\sigma^2}}.$$

5. A demodulator receiving a transmission signal obtained by the method claimed in claim 1 and reproducing said data signal, the demodulator comprising a baseband transposition unit for receiving a signal r(t) which has been modulated by said modulation function h(t−kT), a complex multiplier for multiplying an output signal of the transposition unit by the expression $$e^{-j\frac{\pi t}{2T}},$$

a convolution operator for convoluting an output signal of the complex multiplier and said modulation function, and a decision unit for reproducing said data signal as a function of the sign of the real part of a result of said convolution.

6. A modulator for modulating a digital data signal formed of a series of bits each identified by a respective rank k and each having a duration T, the modulator comprising:

means for providing an input signal F(k) as a function of said data signal;

computing means for computing, for each of a plurality of said ranks k, a respective product of $j^k$, of a modulation function h(t−kT) being a Gaussian function of time t and of said input signal F(k), where j is a complex constant such that $j^2=-1$, and for summing said computed products to provide a transmission signal;

wherein said modulation function is defined as:

$$h(t)=1/(\sigma T_{\sqrt{2}}\Pi)*e^{-(t^2/(2\sigma^2 T^2))}$$

where σ is a form factor determining a bit spreading.

7. A modulator according to claim 6, wherein the computing means comprise a digital processor for receiving said input signal F(k) and producing a real part and an imaginary part of said transmission signal, the modulator further comprising a first mixer for multiplying said real part by a carrier, a phase-shifter for receiving and phase-shifting the carrier by π/2, a second mixer for multiplying said imaginary part by an output signal of the phase-shifter, and an adder for summing output signals of the first and second mixers.

8. A modulator according to claim 6, wherein the means for providing the input signal F(k) are arranged to take said input signal F(k) as equal to:

$$F(k) = \sum_{n=0}^{N} a^n B_k^n$$

where:

N is a positive natural integer, a is a positive correction constant, $B_k^n$ is a polynomial defined as follows:

$$B_k^n = \sum_{l=1}^{L} \left( \prod_{i=0}^{2M} b_{k+p_{l,i}} \right)$$

where:

L is a natural integer; $b_k$ is a but of rank k

M is a natural integer and, for each integer l such that $1 \leq l \leq L$ the $p_{l,i}$'s are relative integers such that:

$$\sum_{i=0}^{M} p_{l,2i} = \sum_{i=1}^{M} p_{l,2i-1}$$

$$\sum_{i=0}^{M} p_{l,2i}^2 - \sum_{i=1}^{M} p_{l,2i-1}^2 = 2n$$

and $p_{l,i} < p_{l,i+1}$ regardless of i).

9. A modulator according to claim 8, wherein the computing means comprise a digital processor for receiving said input signal F(k) and producing a real part and an imaginary part of said transmission signal, the modulator further comprising a first mixer for multiplying said real part by a carrier, a phase-shifter for receiving and phase-shifting said carrier by π/2, a second mixer for multiplying said imaginary part by an output signal of the phase-shifter, and an adder for summing output signals of the first and second mixers.

10. A modulator according to claim 9, wherein said digital processor comprises a first module for producing said polynomials $B_k^n$.

11. A modulator according to claim 10, wherein said digital processor comprises a second module for producing digital samples of said transmission signal, four samples $E_{4k+i}$ being associated with the bit $b_k$ of rank k for i varying from 0 to 3 and each sample $E_{4k+i}$ having the value:

$$E_{4k+i} = \sum_{q=k}^{k-5} j^q \cdot \left( b_q + \frac{1}{8} \cdot B_q^1 + \frac{1}{64} \cdot B_q^2 \right) \cdot h_{4(k-q)+i}.$$

12. A demodulator according to claim 5, wherein said transposition unit comprises a Hilbert filter.

* * * * *